United States Patent Office

3,484,929
Patented Dec. 23, 1969

3,484,929
SOLDERING METHODS AND COMPOSITIONS
Duane A. Schroeder, East Dundee, and Graham L. Gulick, Chicago, Ill., assignors to Methode Electronics, Inc., Chicago, Ill., a corporation of Illinois
No Drawing. Filed Aug. 2, 1966, Ser. No. 569,567
Int. Cl. B23k 31/02
U.S. Cl. 29—495                            8 Claims This invention relates broadly to cleaning methods and compositions. More specifically, it concerns methods of treating copper surfaces to increase their solder wetting properties, compositions for use in rendering copper surfaces ultra-wettable by solder and improved methods of soldering copper surfaces.

FIELD OF THE INVENTION

The technique of joining together copper surfaces or other metal surfaces by application of solder is, of course, very old. Such operations require a chemically clean surface in order for the molten solder when it is applied to properly wet the metal surface and after its application to satisfactorily adhere. Ideally, if the area to which the solder is to be applied consists of a film of copper hydride, the molten solder when brought in contact with it will promptly wet the surface and when the solder is solidified, it will adhere to such surface with the highest degree of tenacity. In practice, such an ideal condition is difficult to attain because the area to be soldered usually consists at least in part of copper oxides, copper sulfides, copper carbonates or the like which are not receptive to molten solder. Hence, only partial wetting of the area to be soldered results, producing, in many cases, in an unsatisfactory solder joint.

The necessity of having the molten solder quickly and uniformly wet the surface of the metal to be soldered is well recognized. Various expedients are employed, therefore, to prepare a metal surface for the application of the molten solder metal. Wire brushing, abrading and similar mechanical working of the metal surface is frequently employed. As an alternative, or in addition to this, fluxing agents are used and these may be applied to the metal surface before or simultaneously with the application of the molten solder. So-called "acid-core" and "rosin-core" solder is a standard item of commerce designed to apply acid or rosin flux at the point of application of molten solder, as the solder is flowed onto the heated metal surface.

Modern electronic circuits and other fields in which soldered connections between metal parts are employed, demand the highest attainable efficiency in soldering operations. One unsatisfactory soldered connection can result in the total rejection of an electronic component, complicated part or the like. Accordingly, much research and development has been devoted to improving soldering operations and developing solder fluxes and other metal cleansing compositions for use in soldering operations.

By and large, most solder fluxes which have been developed and used in the past have employed some form of oxidizing acid with the flux composition normally exhibiting an acid reaction, i.e., with a pH below 7 and frequency with a pH of 1–3. Many forms of soldering fluxes containing acids or acid reacting materials, such as ammonium persulfate, oxalic acid, sulfamic acid, sodium bisulfite, hydrochloric acid, etc., have been developed (see U.S. Patents 1,990,273, 2,291,399 and 2,470,-957).

To a lesser extent, compositions having an alkaline pH have been employed for the treatment of copper and other metal surfaces prior to the application of molten solder. For example, it has been suggested to treat the copper surface with an alkali metal such as sodium, potassium or lithium prior to the application of molten solder (see U.S. 1,753,590). Also, it has been suggested to apply an aqueous cleaner comprising potassium ferro cyanide to pretreat copper surfaces for subsequent soldering (see U.S. 628,427). A wide variety of other soldering fluxes or metal cleaners to be used in improving the solderability of copper surfaces or methods which might be employed to improve solderability of copper have been disclosed (see, for example, U.S. 1,811,667, 2,803,572, 3,081,536 and 3,162,512).

It has been postulated that ideal soldering conditions are obtained if a film of copper hydride is provided on the surface to be soldered at the time the molten solder metal is brought into contact with the substrate. However, a copper hydride is an unstable substance by comparison with cuprous oxide and molten solder causes the hydride to decompose to form free copper and hydrogen gas. Ordinarily when the hydride is decomposed in the atmosphere, cuprous oxide is formed instantly. When the oxygen of the air is excluded or blocked off by molten solder, the result in the formation of an intermetallic compound or alloy which provides perfect solder wetting. Although this desirable result has been recognized by the metal working art for a long time, and many attempts to attain this by various means, including provision of a variety of cleaning or fluxing compositions as discussed above, the electronics industry and other metal fabricating industries continue to be troubled with unsatisfactory soldering results, parts rejects and the like. Accordingly, it would be desirable to provide improvements in soldering techniques which would eliminate the problems discussed above and provide ultra-wettability of copper surfaces by molten solder in soldering operations.

OBJECTS

A principal object of this invention is the provision of new improvements in soldering operations. Further objects include:

(1) The provision of new methods for treating copper surfaces to enhance their ability to be soldered.

(2) The provision of compositions for use in treating copper surfaces to render them ultra-wettable by molten lead-tin alloys, i.e., the so-called soft solders.

(3) The provision of methods for treating predetermined areas of copper surfaces to produce thereon continuous films of copper hydride and to maintain such films until molten solder is brought in contact with the same.

(4) The provision of new forms of alkaline soldering flux compositions that do not appreciably attach the parent metal even when time of contact greatly exceeds that necessary for complete treatment.

(5) The provision of copper surfaces which will accept a uniform solder film when brought into contact with molten soft solder and retain said uniform film when the copper surface is drawn away from the molten mass.

(6) The provision of copper surfaces which maintain their ability to accept and retain a uniform solder film over a period of time as long as several months.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the provision of new metal treating compositions which contain as essential active ingredients, in aqueous solution, an alkali metal cyanide and a copper chelating agent. Advantageously, such compositions will have a pH between about 10 to 12 and may include, in addition to these two essential ingredients, an alkali metal hydroxide.

The objects of the invention are further accomplished by the application of these new compositions to selected predetermined areas of copper surfaces, preferably at ambient temperature, i.e., between about 15–25° C., with the solutions being allowed to remain in contact with the surface at least until a continuous film of copper hydride is formed on the predetermined areas.

The new metal surface treating methods and soldering operations of the invention are characterized by the use as fluxing materials of only reducing agents and, particularly, such agents which are very conductive to the formation of copper hydride. It has been found that the alkali metal cyanides, particularly in combination with alkali metal hydroxides thereby producing relatively high pH conditions, readily decompose copper oxides where they may exist on the metal surface. Although copper cleaners comprising alkali metal cyanides, with and without added hydroxide, are old in the metal cleaning art, such compositions have not been used commercially to improve solderability of copper surfaces apparently because the cyanide compounds deposited on treated copper surfaces are relatively insoluble in water. In contrast, it has now been found that the combination of the alkali metal cyanide with a copper chelating agent creates a vast difference in the effects attained in soldering operations. By way of possible explanation, and without restriction upon the invention, it appears that the combination of the cyanide with the chelating agent causes a copper chelate to be formed from the cyanide compounds deposited on the copper surface by its contact with the aqueous cyanide. Any copper oxide present on the copper surface reacts instantly and completely with the alkali metal cyanide to form cuprous cyanide and this reaction product, which normally would be relatively insoluble, is solubilized in the presence of the chelating agent so that further solution of any copper oxides present on the metal surface can continue. The aqueous alkali metal cyanide reacts with free copper to form cuprous cyanide and hydrogen. The released hydrogen reacts with the copper to form cuprous hydride. Under the conditions created on the copper surface by the treating solutions, the copper hydride is maintained in a stable form, being neither dissolved nor removed by the chelating agent or the alkali metal cyanide. Consequently, attack on the free metal is stopped as a film of hydride is formed. Accordingly, within a short period of time, e.g., a matter of one second to sixty seconds, a continuous film of copper hydride is formed on the copper surface when treated at ambient temperature in accordance with the invention. By way of explanation of the new operations, and without limitation thereon, the following chemical reactions appear to be involved:

$H_2O + KCN \rightleftharpoons KOH + HCN$
$2HCN + Cu_2O \rightleftharpoons 2CuCN + H_2O$
$HCN + Cu \rightarrow CuH_x$
$XH + Cu \rightarrow CuH_x$
$KOH + RH \rightarrow RK + H_2O$ wherein R— represents the chelating agent moiety.

$RK + CuCN \rightarrow R—Cu + KCN$

The composition of the present invention, while removing surface oxides and other contamination, does not attack the parent metal even when time of contact greatly exceeds that necessary for complete cleaning. The reaction products formed between copper and the composition of the present invention are very soluble in water and rinse free of the cleaned surface, leaving a corrosion inhibiting surface film on said copper.

Advantageously, the new composition may consist essentially of an aqueous solution of sodium or potassium hydroxide, sodium or potassium cyanide and triethanolamine or triisopropanolamine.

EXAMPLES

A more complete understanding of the new methods and compositions of this invention may be had by reference to the following disclosure of actual workings in accordance with the invention. In these examples and throughout the remaining specification and claims, all parts and percentages are by weight and all temperatures are in degrees centigrade unless otherwise specified.

Examples 1

An alkaline aqueous solution was prepared by adding the following ingredients in the quantities specified to 800 ml. of water and after complete solution was obtained, adding sufficient additional water to make the total volume equal 1 liter:

Triethanolamine: 0.33 mole, 50 grams.
Potassium cyanide: 1.00 mole, 65 grams.
Potassium hydroxide: 1.00 mole, 56 grams.

This aqueous solution was used to prepare the exposed copper surfaces on laminated printed circuit boards to prepare them for soldering of electrical components to the printed circuits formed on the laminated boards. This was accomplished by momentary immersion, i.e., about 1 to 15 seconds, of the printed circuit board in the aqueous alkaline solution at approximately 18° C. The laminated board was then withdrawn from the treating bath, allowed to drain and then immersed in a wash water bath. It was found that the tarnished copper surfaces on the printed circuit board were quickly cleaned and rendered bright by this operation.

In another form of treatment, the alkaline aqueous solution was sprayed onto the copper surfaces to be soldered and then excess liquid was promptly removed by passing a rubber squeegee across the sprayed surface, and then rinsed. The tarnished copper portions of the laminated board were rendered bright by this operation.

Soldering of electrical components to the treated printed circuit boards resulted in excellent wetting of the copper surfaces by the molten solder metal. All of the electrical connections made by the soldering operations passed all of the standard electrical tests indicating complete success in the new treating compositions and soldering methods to increase ultra-wettability of the copper surface by the solder metal.

Example 2

A cleaner for use in cleaning and improving solderability of printed circuit boards was made by dissolving in one liter of water with agitation, 78 grams of potassium cyanide, 67 grams of potassium hydroxide and 60 grams of 99% triethanolamine. The solution was then employed to treat copper surfaced laminated printed circuit boards.

The solution was used at room temperature. The cleaning action is instantaneous and following immersion for about 15 seconds, the printed circuit boards were water rinsed and blown dry with compressed air.

To check solderability, treated and untreated boards were edge dipped in molten solder comprised of 60% tin and 40% lead at 475° F. It is a usual practice to apply a flux comprising 12–15% by weight of water white rosin dissolved in isopropanol just prior to solder dipping. Theated boards typically show a smooth, uniform solder coating with little or no dewetting after edge dipping. Untreated boards show very considerable dewetting. There appears to be a definite correlation between solder wetting upon edge dipping and upon the wave soldering technique commonly used in final assembly of components on circuit boards.

DISCUSSION OF DETAILS

The new methods of the invention are advantageously applied to copper surfaces, but are contemplated for use with any other metal surface which would normally be soldered and which would be reactive with alkali metal cyanide. By the term "copper surfaces," as employed herein, is meant a surface composed of pure copper or one formed of a copper alloy having such copper content as to be the equivalent of pure copper in its adhesion and acceptability of lead alloy solder compositions. Such surfaces can be in the form of wires, tubes, both interior and exterior surfaces thereof, solid sheets of copper, exposed surfaces of copper films laminated to plastic or other substrates, copper plated surfaces, including electroplated, electroless deposited vapor plated or equivalent plated surfaces, or any other form of copper surface which would be contemplated for soldering in construction of electrical items, appliances, home building or the like.

The methods of the invention are preferably used with so-called soft metal solders, e.g., lead-tin alloys, etc. However, the copper surface treating techniques are contemplated for use with any other soldering operations normally applied to copper surfaces.

Advantageously, the new alkaline treating solutions have a pH between 10 to 12 although it is contemplated that relatively unconcentrated solutions having a pH less or more concentrated having a pH more than this may be employed in special circumstances. It is preferred that the solutions be applied to the copper surface to be treated at a temperature between about 15 to 25° C. although temperatures below or above this are contemplated, e.g., up to 100° C. Care should be taken, particularly in the case of the use of elevated temperatures, to perform operations with ample ventilation or, advantageously, under a ventilation hood or the like, in order to safeguard against possible cyanide poisoning.

Potassium cyanide is a preferred reagent for preparation of the new copper cleaning solutions. However, equivalent reagents can be employed including sodium cyanide and lithium cyanide. The concentration of the cyanide in the solutions may be varied but excellent results have been obtained by the use of between 20 to 200 parts of alkali metal cyanide for each 1000 parts of treating solution. Since water is the predominant component in such solutions, the proportion of the active ingredient can be based, instead of parts of total solution in terms of the water content, i.e., per 1000 parts of water.

Advantageously, triethanolamine is used as the copper chelating agent. However, other chelating agents now known or developed in the future which are capable of forming stable, water-soluble chelates with copper ions in alkaline aqueous media are contemplated for use in the invention. For example, the propanol-1 and propanol-2 homologs of 2,2',2"-nitrilotriethanol are alternatives.

The proportion of copper chelating agent used in the new compositions may be varied. Advantageously, the alkaline aqueous solutions will contain between about 10 to 100 parts per 1000 parts of water. Some possible useable chelating agents will require greater concentration than others. Supplied with the information contained herein, those skilled in the art may readily determine by simple tests the effectiveness of other copper chelating agents for use in preparing these new copper treating solutions and the most effective relative proportions to be employed with any particular agents.

The use of an alkali metal hydroxide or equivalent alkalizing agent in the new treating compositions is preferred but not essential. As those skilled in the art will recognize, the alkali metal cyanides in aqueous solution will create an alkaline condition and reach a state of equilibrium dependent upon the relative concentration of the cyanide solution. Accordingly, the incorporation of the alkali metal hydroxide or its equivalent serves to adjust the pH within the desired range and to preserve the active alkali metal cyanide for its intended use. If the alkali metal hydroxide is employed, it is preferred that it be included in a concentration of about 1 to 100 parts per 1000 parts of water in the aqueous solution.

Although it is advantageous to prepare the new treating solutions shortly before their intended use, these composition shave been found to have good shelf life and, accordingly, they can be compounded well in advance of the proposed use. Furthermore, it is contemplated that concentrates of the active ingredients can be prepared which will simply be mixed with water at the time this becomes necessary in a soldering operation. Highly concentrated solutions comprising undiltued mixtures of the copper chelating agent and the alkali metal cyanide are contemplated for use in this manner. Such concentrates can also include the alkali metal hydroxide. A concentrate of this type would, for example, comprise a mixture of about 1 to 15 parts of copper chelating agent and 1 to 10 parts of alkali metal hydroxide for each 10 parts of alkali metal cyanide.

The application of the aqueous alkaline metal treating solutions to the copper surface can be performed in any satisfactory manner. Dipping, spraying, roller coating, blade coating or the like may be employed. Dyes, coloring agents, fluorescent agents or the like may be used to outline or mark the area to which the treating solution has been applied, but normally this will not be found necessary since such areas are easily discernible because the normally tarnished appearance of the copper is quickly brightened upon application of the new treating solutions.

CONCLUSION

New methods and compositions for rendering copper surfaces ultra-wettable by molten solder metal have been described above. These are based on the formulation of copper surface treating solutions comprising alkali metal cyanides and copper metal chelating agents and the use of such solutions to form continuous films of copper hydride upon the surface of copper metal at the time that molten solder metal is brought in contact therewith. Such solutions may be employed in conjunction with any normal copper soldering operating to improve both speed and quality of the solder connection.

Having described the invention for the purpose of distinguishing it from what has been known heretofore and to enable those skilled in the art to practice the invention, the protection sought by United States Letters Patent is defined by the following claims.

We claim:
1. A method of soldering copper surfaces which comprises:
   (A) providing an aqueous alkaline solution essentially containing as its active ingredients:
      (a) an alkaline metal cyanide,
      (b) a copper chelating agent,
   (B) wetting predetermined portions of a copper surface with said solution, and
   (C) applying molten solder to copper surface portions wetted with said solution in step B.
2. A method of soldering as claimed in claim 1 wherein said aqueous alkaline solution consists essentially of the following ingredients in the parts by weight specified:

| | Parts |
|---|---|
| Triethanolamine | 50 |
| Potassium cyanide | 65 |
| Potassium hydroxide | 56 |
| Water | 1000 |

3. A method of soldering as claimed in claim 1 wherein said alkali metal cyanide is potassium cyanide.
4. A method of soldering as claimed in claim 1 wherein said chelating agent is triethanolamine.
5. A method of soldering as claimed in claim 1 wherein said aqueous solution contains an alkali metal hydroxide and has a pH between about 10 and 12.

6. A method of soldering as claimed in claim 1 wherein said wetting step B is performed at a temperature between about 15–25° C. and said solution is allowed to remain in contact with said copper surface until a film of copper hydride is formed upon said predetermined portions of copper surface.

7. A method of soldering as claimed in claim 1 wherein said solution has a pH between about 10 and 12 and contains said active ingredients in the following parts by weight per 1000 parts of water:

(a) Alkali metal cyanide _____ 20–200
(b) Copper chelating agent _____ 10–100

8. A method as claimed in claim 7 wherein said solution contains 1–100 parts of alkali metal hydroxide per 1000 parts of water.

References Cited

UNITED STATES PATENTS

| | | | |
|---|---|---|---|
| 363,593 | 5/1887 | Clamer | 117—51 |
| 712,230 | 10/1902 | Young | 148—26 |
| 2,512,455 | 6/1950 | Alexander | 29—494 |

JOHN F. CAMPBELL, Primary Examiner

R. J. SHORE, Assistant Examiner

U.S. Cl. X.R.

117—51; 148—26